Patented Mar. 15, 1932                                                                1,849,655

UNITED STATES PATENT OFFICE

WALTER S. BAYLIS AND CHESTER TIETIG, OF LOS ANGELES, CALIFORNIA, ASSIGNORS TO FILTROL COMPANY OF CALIFORNIA, OF LOS ANGELES, CALIFORNIA, A CORPORATION OF CALIFORNIA

FAT-SPLITTING ADSORBENT AND PROCESS OF MAKING SAME

No Drawing.         Application filed January 30, 1929.    Serial No. 336,327.

This invention has for its object the provision of an industrial reagent capable of simultaneously splitting a fat of animal or vegetable origin into glycerol and free fatty acid, and of clarifying and decolorizing these products substantially when they are formed.

In addition, it is also our object to provide a process whereby the said reagent can be chemically formed in a shorter period of time than heretofore and by which process the reaction will be unusually complete and the products free from deleterious substances.

Briefly stated, our product consists of the combination of a porous, active, mineral adsorbent base capable of decolorizing oils, fats and waxes, which is impregnated with an organic sulfonated substance which is hereinafter referred to as the "saponifier".

In our improved process of making some of our products, we form the saponifier by sulfonating the organic base thereof in situ in the adsorbent. In this way we are able to take advantage of the immense surface presented by the mineral base to bring about extremely intimate contact between the organic base and the sulfonating agent, whereby complete sulfonation takes place rapidly and at a comparatively low temperature.

There are two general classes of saponifiers which we may make in our process, and these are known as the Twitchell reagents and the Schrauth reagents respectively. The Twitchell reagents are sulfo-fatty or sulfo-fatty-aromatic acids. The Schrauth bases are hydrocarbon-group-substituted aromatic sulfonates. In our process we mix such chemicals as will, when sulfonated, form either the Twitchell or Schrauth bases, with our mineral adsorbent base which has been previously impregnated with sulfuric acid of sulfonating strength. We may then heat the mixture slightly, if necessary, in order to sulfonate the bases in situ and so make the saponifier.

A considerable part of the success of our invention is due to the character of the mineral adsorbent which we employ. While we may use such substances as silica gel or fuller's earth, we prefer to use the acid-activated clay known as "Filtrol". It is made by a process of treating a bentonite or smectite type of clay with sulfuric acid and then washing out the reaction products in a somewhat similar manner to that described in the U. S. Patent No. 1,397,113 to P. W. Prutzman, and the product of the process of said patent may be used as a full equivalent of "Filtrol".

In these latter products, the salts resulting from the activation of the clay by sulfuric acid have been carefully washed out, so that the porous structure which remains is substantially unaffected by the addition of strong acid. It is an excellent material, particularly when containing a small percentage of free concentrated sulfuric acid, for decolorizing oils and fats. It has the effect of leaving the refined oils substantially mineral-acid free.

In order to practice our invention, therefore, we first impregnate filtrol, or like material, with sulfuric acid which may range in strength from 60% to 100% $H_2SO_4$. We use varying amounts of acid according to how difficult the organic base is to sulfonate and the amount of adsorbent present. For each pound of adsorbent we may add from ⅛ pound to 1½ pounds of acid. We prefer to have so much acid present that there will be from 10% to 50% in excess of that required to sulfonate the organic base. The sulfonated organic base is preferably present in our product in proportions ranging from 1% to 25% of the weight of the adsorbent. If too great a proportion of saponifier is used, the decolorizing efficiency of the adsorbent is interfered with.

The organic bases to be mixed with the acidified adsorbent may be of considerably varying composition. We may use an approximately 40% solution of oleic, palmitic or stearic acid in benzene, naphthalene or phenol. The solution is used in such proportion that one-half or more of the sulfuric acid present will be consumed in sulfonating the aromatic solvent. From 0.05 lb. to 0.60 lb. of oleic acid may therefore be used per pound of dry adsorbent. We prefer to use the stearic acid in naphthalene and to do so we must work at temperatures above the melting point of naphthalene. The phenol solutions require temperatures above the melting point of the phenol. Benzol is of course usually liquid.

The above mixtures will give, on sulfonation, the Twitchell type saponifiers. If we wish to make Schrauth type saponifiers, we may use as organic bases the isopropyl, isobutyl, or cyclohexyl substituted derivatives of naphthalene, anthracene, or phenanthrene, also dimethyl tetra-hydronaphthalene, octohydro anthracene, and methyl-ethyl carbinol. It is to be understood that these hydrocarbons will be used unsulfonated to mix in with the acidified base.

The solutions are then added to the acidified base at suitable temperature and thoroughly mixed therewith.

Usually sulfonation will take place without any additional heat being necessary, but if it is, we may supply it up to 150° C. for any suitable length of time. During the heating period a reflux condenser may be placed over the reacting mass to prevent loss of volatiles. A two hours' heating will be sufficient for all cases and in most instances shorter periods will suffice. There does not appear to be any simple way of judging when the reaction is complete but the difference in the fat-splitting efficiency of the product will give a good indication. Strong acid in excess at high temperature will of course sulfonate more quickly than weak acid at lower temperatures. We prefer to employ the higher temperatures but to use little acid, and that of high strength. In this way great excesses of acid, which have a tendency to darken the fats, are avoided. The excess acid should be 1%, or below, of the weight of the dry absorbent base.

In a modification of our invention we may introduce into the acidified base the alkali or alkali-earth metal salts of the sulfonated organic bases previously mentioned. For instance, we may incorporate sodium naphthalene stearo sulfonate (see U. S. Patent No. 1,170,468, to E. Twitchell) or the sodium or barium salt of isopropyl naphthalene sulfonate (see U. S. Patent No. 1,576,005, to W. Schrauth) with our acidified mineral base and so win back the active saponifier (the free sulfonic acid) by neutralization of the alkali or alkali-earth metal component of its salt, leaving the finished reagent in acid condition from excess $H_2SO_4$. Such operation is convenient and quick, and gives a good distribution of the saponifier in the base.

Our reagents are to be used to split fats in the same manner as the Twitchell and Schrauth reagents are used.

After the fat-splitting process is complete, it will be found that the products are of substantially lighter color than would be the case if only the saponifier had been used. This lightening of color is due to the agitation which the fats or oils have received in the reaction vat with water and the adsorbent. In case this action has been insufficient, the fatty acids may be given additional agitation, preferably at temperatures near or at the boiling point of water, in order to complete the purification. Additional quantities of fresh adsorbent may be added at this point.

After the reaction is complete, the adsorbent is separated from the oil and glycerol-containing water by filtration or any other suitable means.

For the sake of illustration only, the following example is given. In this case a reagent of the Twitchell type is formed and used.

Five pounds of filtrol are thoroughly incorporated with one and one-half pounds of 66° Bé. sulfuric acid, even distribution being obtained by sprinkling the acid upon the filtrol while stirring the latter. A solution of 0.4 lb. of oleic acid in 0.6 lb. benzene is then prepared and this solution is thoroughly mixed in the acidified filtrol at a temperature not over 30° C. It is allowed to stand at such temperature with occasional stirring during twenty-four hours.

The reagent so prepared is then added in toto to 100 lbs. of crude soy bean oil and fifty lbs. of soft water. The entire mass is then boiled with open steam from twelve to twenty hours, depending upon the amount of decomposition desired. Twenty hours will give a splitting of over 97% of the oil present. The contents of the vat are then allowed to stratify into layers, the top or fatty layer decanted and filtered through a filter press and the lower or aqueous layer, containing most of the adsorbent, rejected.

We claim as our invention:

1. The process of making a combined fat-splitting and decolorizing reagent which comprises: mixing an organic substance, which when sulfonated is capable of splitting fats and the like, with an adsorbent base containing a sulfonating agent.

2. The process of making a combined fat-splitting and decolorizing reagent which comprises: reacting an organic substance, which, when acted upon by sulfuric acid under sulfonating conditions, is capable of forming a reagent by which fats and the like may be split, with such a sulfonating agent under sulfonating conditions, said sulfonating agent having been previously adsorbed in a mineral powder capable of decolorizing fats and oils.

3. A process according to claim 2 in which the sulfonating agent is present in the mineral powder in such quantity as to be in excess of that required to sulfonate the substance which on sulfonation yields the fat-splitting agent.

4. A process according to claim 2 in which the sulphonating agent is present in the mineral powder in such quantity and such strength as to leave the finished reagent acid to an extent not exceeding 1% of 100% strength acid calculated on the weight of the dry mineral powder.

5. The process which comprises: mixing a fatty acid with an aromatic solvent thereof and then sulfonating the said mixture to make a fat-splitting reagent by mixing it with a porous base capable of exerting a decolorizing reaction, said base having been previously impregnated with sulfuric acid of sulfonating strength, and then maintaining the base and fatty-aromatic mixture in contact at a sulfonating temperature for a sufficient length of time to allow the reaction to become approximately complete.

6. The process of sulfonating a substance capable thereof which comprises: mixing said substance with an organic powdered adsorbent base previously impregnated with sulfuric acid of sulfonating strength in quantity sufficient to sulfonate said substance, then adjusting the temperature to that at which sulfonation takes place and maintaining said temperature until the sulfonation is approximately complete.

7. The process which comprises: mixing naphthalene and stearic acid together above their melting points, incorporating an adsorbent mineral base capable of decolorizing fats and oils, said base being impregnated with strong sulfuric acid, and heating the entire mixture together until sulfonation is approximately complete.

In testimony whereof, we have hereunto set our hands at Los Angeles, California, this 25th day of January, 1929.

WALTER S. BAYLIS.
CHESTER TIETIG.

CERTIFICATE OF CORRECTION.

Patent No. 1,849,655.   Granted March 15, 1932, to

WALTER S. BAYLIS ET AL.

It is hereby certified that error appears in the printed specification of the above numbered patent requiring correction as follows: Page 3, line 18, claim 6, for the article "a" read an organic, and line 20, same claim, strike out the words "an organic" and insert the article a; and that the said Letters Patent should be read with these corrections therein that the same may conform to the record of the case in the Patent Office.

Signed and sealed this 3rd day of May, A. D. 1932.

(Seal)

M. J. Moore,
Acting Commissioner of Patents.

eral powder in such quantity and such strength as to leave the finished reagent acid to an extent not exceeding 1% of 100% strength acid calculated on the weight of the dry mineral powder.

5. The process which comprises: mixing a fatty acid with an aromatic solvent thereof and then sulfonating the said mixture to make a fat-splitting reagent by mixing it with a porous base capable of exerting a decolorizing reaction, said base having been previously impregnated with sulfuric acid of sulfonating strength, and then maintaining the base and fatty-aromatic mixture in contact at a sulfonating temperature for a sufficient length of time to allow the reaction to become approximately complete.

6. The process of sulfonating a substance capable thereof which comprises: mixing said substance with an organic powdered adsorbent base previously impregnated with sulfuric acid of sulfonating strength in quantity sufficient to sulfonate said substance, then adjusting the temperature to that at which sulfonation takes place and maintaining said temperature until the sulfonation is approximately complete.

7. The process which comprises: mixing naphthalene and stearic acid together above their melting points, incorporating an adsorbent mineral base capable of decolorizing fats and oils, said base being impregnated with strong sulfuric acid, and heating the entire mixture together until sulfonation is approximately complete.

In testimony whereof, we have hereunto set our hands at Los Angeles, California, this 25th day of January, 1929.

WALTER S. BAYLIS.
CHESTER TIETIG.

CERTIFICATE OF CORRECTION.

Patent No. 1,849,655.                    Granted March 15, 1932, to

WALTER S. BAYLIS ET AL.

It is hereby certified that error appears in the printed specification of the above numbered patent requiring correction as follows: Page 3, line 18, claim 6, for the article "a" read an organic, and line 20, same claim, strike out the words "an organic" and insert the article a; and that the said Letters Patent should be read with these corrections therein that the same may conform to the record of the case in the Patent Office.

Signed and sealed this 3rd day of May, A. D. 1932.

M. J. Moore,
Acting Commissioner of Patents.

(Seal)

CERTIFICATE OF CORRECTION.

Patent No. 1,849,655.                              Granted March 15, 1932, to

WALTER S. BAYLIS ET AL.

It is hereby certified that error appears in the printed specification of the above numbered patent requiring correction as follows: Page 3, line 18, claim 6, for the article "a" read an organic, and line 20, same claim, strike out the words "an organic" and insert the article a; and that the said Letters Patent should be read with these corrections therein that the same may conform to the record of the case in the Patent Office.

Signed and sealed this 3rd day of May, A. D. 1932.

(Seal)

M. J. Moore,
Acting Commissioner of Patents.